United States Patent
Chiu et al.

(10) Patent No.: US 9,208,959 B2
(45) Date of Patent: Dec. 8, 2015

(54) SUPER CAPACITOR STRUCTURE AND THE MANUFACTURE THEREOF

(71) Applicant: FENG CHIA UNIVERSITY, Taichung (TW)

(72) Inventors: Kuo-Feng Chiu, Taichung (TW); Shi-Kun Chen, Taichung (TW); Tse-Hao Ko, Taichung (TW)

(73) Assignee: FENG CHIA UNIVERSITY, Taichung (TW)

( * ) Notice: Subject to any disclaimer, the term of this patent is extended or adjusted under 35 U.S.C. 154(b) by 0 days.

(21) Appl. No.: 14/556,229

(22) Filed: Nov. 30, 2014

(65) Prior Publication Data

US 2015/0121671 A1    May 7, 2015

Related U.S. Application Data

(62) Division of application No. 13/418,342, filed on Mar. 12, 2012, now Pat. No. 8,947,853.

(30) Foreign Application Priority Data

Oct. 4, 2011   (TW) .............................. 100135833 A

(51) Int. Cl.
| | |
|---|---|
| H01G 9/00 | (2006.01) |
| H01G 11/86 | (2013.01) |
| H01G 11/32 | (2013.01) |
| H01G 11/36 | (2013.01) |
| H01G 11/38 | (2013.01) |
| H01G 11/40 | (2013.01) |
| H01G 11/42 | (2013.01) |
| H01G 13/04 | (2006.01) |

(52) U.S. Cl.
CPC ............... *H01G 11/86* (2013.01); *H01G 11/32* (2013.01); *H01G 11/36* (2013.01); *H01G 11/38* (2013.01); *H01G 11/40* (2013.01); *H01G 11/42* (2013.01); *H01G 13/04* (2013.01); *Y02E 60/13* (2013.01)

(58) Field of Classification Search
CPC .... H01G 9/0029; H01G 9/0036; H01G 11/32
See application file for complete search history.

(56) References Cited

U.S. PATENT DOCUMENTS

| | | | |
|---|---|---|---|
| 7,235,333 B2 * | 6/2007 | Yamamoto et al. ........... | 429/317 |
| 8,947,853 B2 * | 2/2015 | Chiu et al. ................... | 361/502 |
| 2007/0154779 A1 * | 7/2007 | Ko et al. ........................ | 429/44 |

* cited by examiner

*Primary Examiner* — Seahvosh Nikmanesh
(74) *Attorney, Agent, or Firm* — Cheng-Ju Chiang

(57) ABSTRACT

Disclosed is a super capacitor and method of manufacture thereof. This invention relates to a solid state super capacitor comprising a solid state polymer electrolyte and a modified carbonaceous electrode. Said modified carbonaceous electrode comprises a conductive carbonaceous material covered with active ingredients. Said modified carbonaceous electrode and said solid state polymer electrolyte are layered on top of each other to form a sandwich-like structure. Said super capacitor performs much better than known super capacitor comprising liquid or gel-form electrolytes. Said super capacitor has higher conductivity, therefore can be manufactured without a current collector. Since said super capacitor contains solid state polymer electrolyte, the method of manufacturing said super capacitor is more environmentally friendly and has a higher safety level.

18 Claims, 9 Drawing Sheets

SUPER CAPACITOR STRUCTURE AND THE MANUFACTURE THEREOF

CROSS-REFERENCE TO RELATED APPLICATIONS

This application is a divisional application of U.S. patent application Ser. No. 13/418,342, filed on Mar. 12, 2012, which is incorporated by reference, and which claims the benefit of Taiwanese Patent Application No. 100135833, filed on Oct. 4, 2011, under 35 U.S.C. §119. Each of the above applications is incorporated by reference herein.

FIELD OF THE INVENTION

The present invention generally relates to a super capacitor, and more particularly to a super capacitor structure and method of manufacture thereof.

BACKGROUND OF THE INVENTION

Super capacitors are usually referred to Electric Double Layer Capacitor, EDLC, as shown in FIG. 1, which includes components such as an electrode 1 containing a metallic current collector 2, a liquid or gel-like electrolyte 3, a separator 4 and a conductive pad 20. The EDLC can be rapidly charged and discharged through the charge adsorption effect of the electric double layer on the surface of the electrode. Super capacitors have a capacity as high as $1\sim10^3 F$ or more. The charge and discharge power ratio of super capacitors is much higher than that of the secondary batteries (Lithium battery or lead-acid battery), and the level of transient output current of super capacitors is extremely high. However, the total storage capacity of super capacitors is inferior to secondary batteries. Super capacitors are applied primarily in electronic industry, followed by energy or green-energy industry and transportation industry. Super capacitors for commercial purpose have been successful for the past 30 years. However, the demand was low in early stage due to the high price. With the improvement in function and performance, lower price range, and fast increase of applications in the last decade, now is the best time to develop and produce super capacitors. Nevertheless, super capacitors currently on the market have problems such as high resistance, complex manufacturing process, and contain liquid or gel-like electrolytes.

TABLE 1

Problems of super capacitors currently on the market.

| Item | Currently known super capacitors | Problem |
|---|---|---|
| Electrode | Activated carbon, carbon black, metal-oxides, and conductive polymeric adhesives. | Insufficient conductivity. Flat electrode, lower specific surface area. |
| Electrolyte | Liquid or gel-like under room temperature. Water based or organic electrolyte. | Possess chemical toxicity, flammable, potential leakage hazards, and complex manufacture procedures. Unable to function under extremely high or low temperature. |
| Other parts | Separator, current collector, conductive pad | Require metallic current collector due to insufficient conductivity of the electrode. Require separator due to the usage of liquid or gel-like electrolyte. |
| Manufacturing process and equipment | Factory layout and equipment are expensive | Require expensive clean room and factory design. Require costly equipment to accommodate the manufacture of liquid or gel-like electrolyte. |

SUMMARY OF THE INVENTION

To overcome the aforementioned drawbacks, embodiments of the invention disclose a super capacitor structure and method of manufacture thereof.

The present invention employs a modified carbonaceous electrode and a solid polymer electrolyte. A super capacitor structure comprising in contiguity a modified carbonaceous electrode, a solid polymer electrolyte interposed between the modified carbonaceous electrode, and a conductive pad electrically connected at least a portion of the modified carbonaceous electrode characterized in that the modified carbonaceous electrode comprises an active material in a three-dimensional state. The present invention does not require a separator since the present invention does not employ liquid or gel-like electrolyte. The present invention does not require a metallic current collector because the modified carbonaceous electrode has a high conductivity. The super capacitor structure is very different form the super capacitors currently known on the market. A sample of the present invention was tested to have a power ratio density of $2\sim10$ kW/kg, and an energy ratio of $3\sim20$ Wh/kg. The test results indicate that the power ratio density of the present invention is about the same as super capacitors currently on the market, however the energy density is higher than that of the super capacitors currently known.

The present invention uses solid polymeric electrolyte, this feature helps to simplify the manufacturing procedures and eliminate issues concerning toxicity and fire hazard. The present invention is safer to use and easier to produce compared with previously known super capacitors that employ liquid or gel-like electrolytes. Moreover, the manufacturing procedures produce lesser toxic or chemical waste and the product of the procedures is not easy to explode. The present invention features better performances, lower cost, and the production process is safer and more environmental friendly. The following table indicates the features of the present invention compared with super capacitors currently on the market:

TABLE 2

Comparisons between the present invention and the currently known super capacitors

| Item | Currently known super capacitors | Present invention | Features of the present invention |
|---|---|---|---|
| Electrode materials | Activated carbon, carbon black, metal-oxides, and conductive polymeric adhesives. | Special carbon structure and active materials | Modified carbonaceous electrode High conductivity High specific surface area |
| electrolyte | Liquid or gel-like under room temperature. Water based or organic electrolyte. | Solid polymer electrolyte | No chemical toxicity, not easy to catch on fire, simplified manufacturing procedure |
| Other parts | Separator, current collector, conductive pad | Conductive pad | Does not require separator or current collector |
| Manufacturing process and equipment | Factory layout and equipment are expensive | Simplified manufacturing process | Easier to set up a factory |
| Cost | Expensive hardware and procedures | Less hardware required, cheaper production process | Lesser investment on money and equipment |
| Product properties | Better charge and discharge performance | As good as or better than super capacitors currently known | |
| Product safety | Potential fire hazard and leakage possibilities of the electrolyte | Raise no such concerns | Safer to use |

As shown in FIG. 2, the present invention discloses a super capacitor structure comprising in contiguity a modified carbonaceous electrode, a solid polymer electrolyte interposed between the modified carbonaceous electrode, and a conductive pad electrically connected at least a portion of the modified carbonaceous electrode characterized in that the modified carbonaceous electrode comprises an active material in a three-dimensional state. Wherein the modified carbonaceous electrode is comprised of a conductive carbonaceous material containing an active material and has a high specific surface area. The conductive pad and the modified carbonaceous electrode can also be arranged in layers or in a sandwich-like manner as shown in FIG. 3.

One embodiment of the structure of the modified carbonaceous electrode is as indicated in FIG. 4. The conductive carbonaceous material can be comprised of a carbon cloth, a carbon felt, a carbon paper, a carbon fiber, a carbon pellet, or a carbon powder, that has a high conductivity and high specific surface area, wherein the active material is distributed on extensive area within the vacant spaces and/or on the surface of the conductive carbonaceous material. This method improves the performance of the disclosed super capacitor and elevates the charge transport efficiency.

FIG. 4 shows that every fiber of the conductive carbonaceous material is evenly covered with the active material. The active material is selected from electrostatic materials (such as: activated carbon powder, highly conductive carbon black or carbon powder, or the mixture of polymeric adhesives), Faradaic metal-oxides (such as: $RuO_2$, carbon black, or the mixture of polymeric adhesives), or Faradaic conductive polymers (such as doped type ion-conducting polymer, carbon black, or the mixture of polymeric adhesives). Since every fiber of the conductive carbonaceous material is evenly covered with the active material, the active material is hence distributed on the conductive carbonaceous material in a three-dimensional state. This helps to increase the total surface area covered with the active material, and shortens the route for the electron to enter and exit the electrode. These features remarkably increase the capacitance density (the capacity of the electrode in a unit area, $F/cm^2$) and the electrical power ratio density (the discharge electrical power of the electrode per unit area, $kW/cm^2$). Therefore, the super capacitor disclosed in the present invention performs much better than the super capacitors currently on the market.

Distributing the active material on every carbon fiber of the modified carbonaceous electrode in a three-dimensional state or at least cover part of the carbon fiber allows the electrode to become highly conductive, high in mechanical stiffness, and high performance in charge and discharge properties. Since the active material is evenly distributed within the vacant spaces and/or on the surface of the conductive carbonaceous material, the route for electron to entering and exiting is shortened. The resistance and the interface resistance are both very low, which is better than traditional super capacitors such as traditional active carbon electrodes, metal-oxide electrodes, or conductive polymers. Moreover, the modified carbonaceous electrode has a high conductivity; therefore the current enters and exits the super capacitor directly without the help of a metal current collector. On the other hand, a metal current collector has to be connected to the electrode in traditional super capacitors to collect the current and then transfer the current in or out of the super capacitor via a conductive pad.

The present invention employs the art of producing the conductive carbonaceous material and the technique of distributing the active material on the conductive carbonaceous material in a three-dimensional state, therefore gives the present invention improved features such as high specific capacity and high charge and discharge electric power.

The modified carbonaceous electrode can be made by a first manufacturing procedure. The first manufacturing procedure uses a high quality carbon fabric as a conductive carbonaceous material (the carbon fabric is manufactured according to U.S. Pat. No. 7,670,970B2 and U.S. Pat. No. 7,927,575B2), wherein an active material is distributed on the conductive carbonaceous material. The conductive carbonaceous material includes a carbon cloth, a carbon felt, a carbon paper, a carbon fiber, a carbon pellet, or a carbon powder. The conductive carbonaceous material has a sheet resistance of less than 200 Ω/sq, a density greater than 1.6 g/cm$^3$, and a carbon content of greater than 65 wt %. The active material is distributed within the vacant spaces and/or on the surface of the conductive carbonaceous material by painting, tape casting, pressing, spraying, immersing, or the combination thereof. After a baking process within the temperature range of 60 to 400° C., the active material is hence solidified and the modified carbonaceous electrode is ready for further manufacture.

The modified carbonaceous electrode can also be made by a second manufacturing procedure. The second procedure employs the carbon fiber as the conductive carbonaceous material. The carbon fiber is first covered with the active material and baked as described in the first manufacturing procedure. The carbon fiber is then weaved in a two dimensional, three dimensional, or more than three dimensional ways to form a carbon cloth and becomes the modified carbonaceous electrode. The carbon fiber carrying the active material can also be made into a carbon felt by needle punching, or into a carbon paper or a carbon hand-sheet by paper making process. The carbon felt and the carbon paper can therefore become the modified carbonaceous electrode. Both the first and the second manufacturing procedures allow the active material to be evenly distributed on every surface or at least on part of the surface of each carbon fiber within or on the surface of the conductive carbonaceous material.

The active material mentioned above includes a main component, a conductivity additive, and an adhesive. Wherein about 80 wt % or more of the active material is the main component. The main component includes Non-Faradaic or electrostatic components such as an activated carbon, or a Faradaic component or a Redox type component such as a metal-oxide (such as the powder of $RuO_2$, $TiO_2$, $MnO_2$, $ZnO$, $NiO_x$, $IrO_2$ . . . etc. or the mixture thereof) or an ion-conducting polymer (such as: PEEK, SPEEK, PPV, PEKK, PEO, Nafion, PVA, PTFE, PPy, pMeT, PVDF, PEDOT, PANI, or the mixture thereof). The conductivity additive includes highly conductive carbon powder such as a carbon black, a grapheme, or a carbon nanotube. About 5 wt % to no greater than 10 wt % of the active material is the conductivity additive. The adhesive includes commonly known adhesive polymers, or solid electrolytic polymers. About 10 wt % to no greater than 15 wt % of the active material is the adhesive. The ion-conducting polymer mentioned above can serve as the Redox type main component of the active material, as the solid polymer electrolyte membrane, or as the adhesive of the active material.

Reference for the chemical compounds mentioned in this specification is as follow:
PEEK: Polyether ether ketone
SPEEK: Sulfonated polyether ether ketone
PPV: Polyphenylene vinylene
PEKK: Poly (ether ketone ketone)
PEO: Polyethylene oxide
PVA: Polyvinyl alcohol
PTFE: Polytetrafluoroethylene
PEDOT: Polyethylenedioxythiophene
PANI: Polyaniline
PPy: Polypyrrole
Nafion: a sulfonated tetrafluoroethylene based fluoropolymer-copolymer.
Nafion is a product name of the U.S. company, DuPont.
PVDF: Polyvinylidene fluoride

DETAILED DESCRIPTION OF THE INVENTION

The present invention may best be understood by reference to the following description in conjunction with the accompanying drawings.

Figure 1:
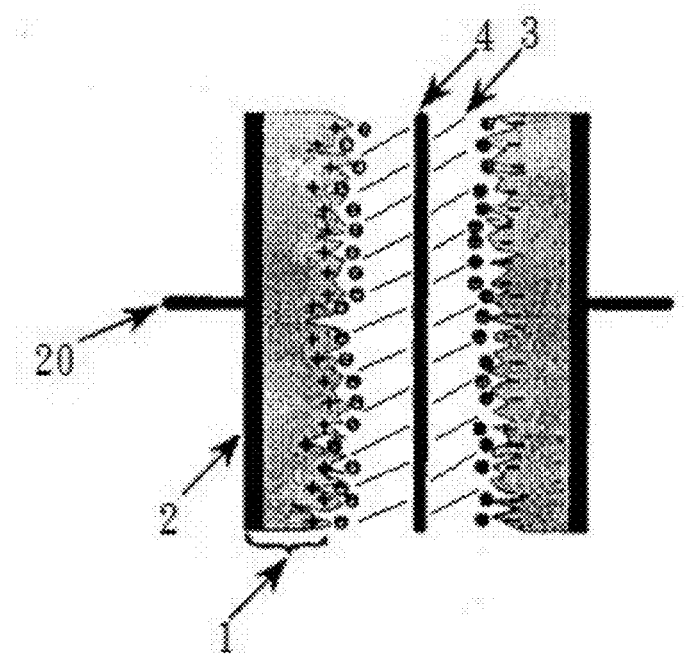
FIG. 1 shows the structure of a currently known super capacitor (prior art).
Figure 2:
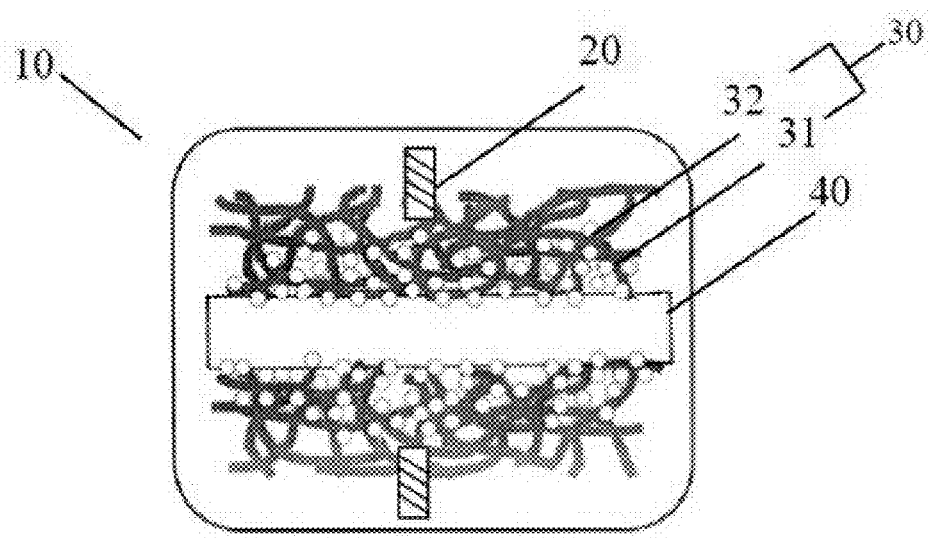
FIG. 2 is a cross-sectional view of one embodiment of the present invention.
Figure 3:
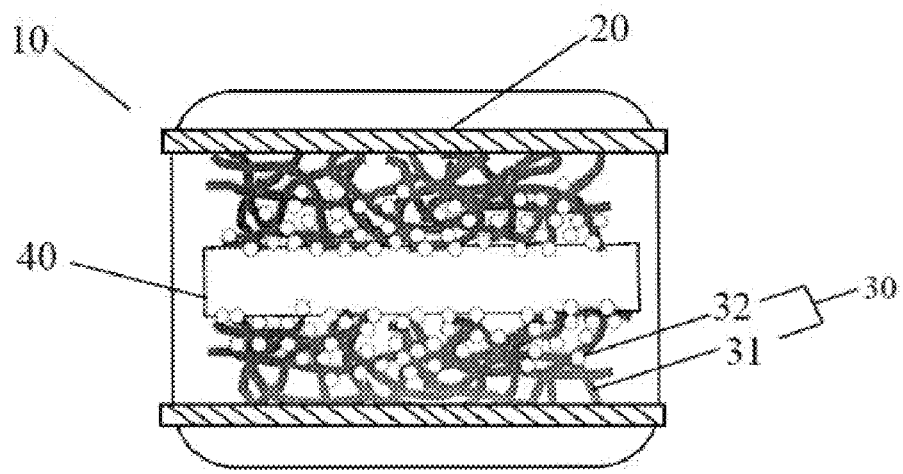
FIG. 3 is a cross-sectional view of another embodiment of the present invention.
Figure 4:
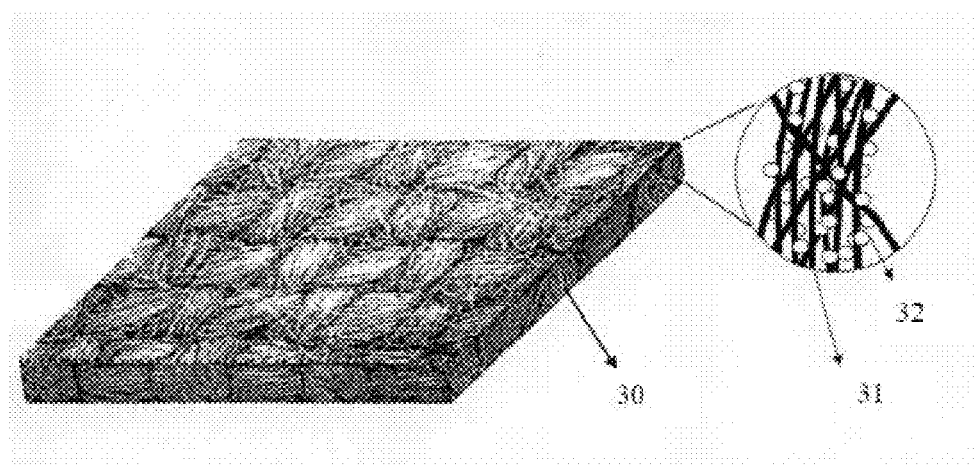
FIG. 4 shows the structure of a modified carbonaceous electrode of the present invention.

One embodiment of the present invention is as shown in FIG. 2, FIG. 3 and FIG. 4. A super capacitor structure 10 comprising in contiguity a modified carbonaceous electrode 30, a solid polymer electrolyte 40 interposed between the modified carbonaceous electrode 30, and a conductive pad 20 electrically connected at least a portion of the modified carbonaceous electrode 30 characterized in that the modified carbonaceous electrode 30 comprises an active material 32 in a three-dimensional state. The modified carbonaceous electrode 30 includes a conductive carbonaceous material 31 or highly conductive carbon fabrics such as a carbon cloth, a carbon felt, a carbon paper, a carbon fiber, a carbon pellet, or a carbon powder.

Figure 6:
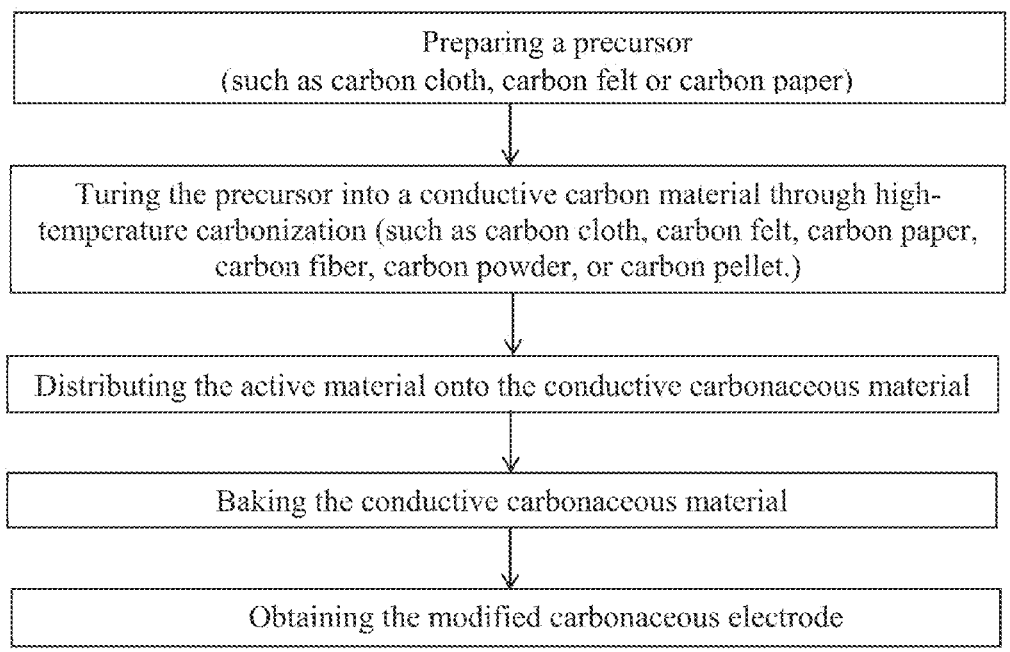
FIG. 6 shows the first manufacturing procedure for the modified carbonaceous electrode.

A first manufacturing procedure (see FIG. 6) for the modified carbonaceous electrode 30 includes:
1. Preparing a precursor such as cloth, felt, or paper.
2. Turning the precursor into a conductive carbon material 31 through high-temperature carbonization. The precursor of the conductive carbon material 31 includes a carbon cloth, a carbon felt, a carbon paper, a carbon fiber, a carbon powder, or a carbon pellet.
3. Distributing the active material 32 onto the conductive carbonaceous material 31.
4. Baking the conductive carbonaceous material 31.
5. Obtaining the modified carbonaceous electrode 30.

The conductive carbonaceous material 31 has a sheet resistance of less than 200 Ω/sq, a density greater than 1.6 g/cm$^3$, a carbon content of greater than 65 wt %, and a specific surface area between 20 and 2000 m$^2$/g.

Figure 7:
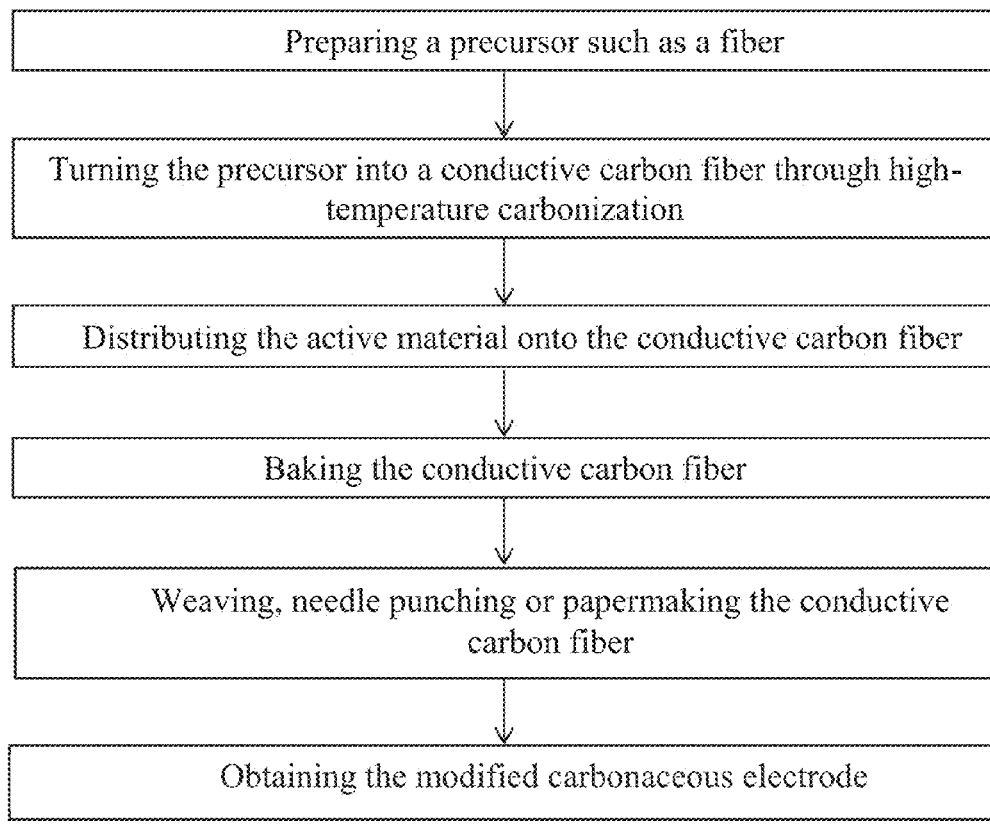
FIG. 7 shows the second manufacturing procedure for the modified carbonaceous electrode.

A second manufacturing procedure (see FIG. 7) for the modified carbonaceous electrode 30 includes:

1. Preparing a precursor such as a fiber.
2. Turning the precursor into a conductive carbon fiber through high-temperature carbonization. Wherein the conductive carbon fiber serves as the carbonaceous conductive material 31 in the second manufacturing procedure.
3. Distributing the active material 32 onto the conductive carbon fiber.
4. Baking the conductive carbon fiber.
5. Obtaining the modified carbonaceous electrode 30 from the conductive carbon fiber by weaving, needle punching, or papermaking process.

The conductive carbon fiber has a resistivity lower than $5 \times 10^{-2}$ Ω/cm, a density greater than 1.6 g/cm$^3$, a carbon content greater than 65 wt %, and a specific surface area between 20 and 2000 m2/g.

In both the first and the second manufacturing procedures, the active material 32 is evenly distributed on at least part of the conductive carbonaceous material 31 in a three-dimensional state. The method used to distribute the active material 32 includes painting, tape casting, pressing, spraying, immersing, or the combination thereof. The active material 32 can be in a paste-like state. The active material 32 is solidified by baking within 60 to 400° C.

The active material 32 includes a main component, a conductivity additive, and an adhesive. Wherein the main component is an activated carbon powder with a specific surface area between 20 and 2000 m$^2$/g. The main component includes PEEK, SPEEK, PPV, PEKK, PEO, Nafion, PVA, PTFE, PPy, pMeT, PVDF, PEDOT, PANI, or the combination thereof. The main component may also include metal-oxide powder such as $RuO_2$, $TiO_2$, $MnO_2$, ZnO, $NiO_x$, $IrO_2$, or the combination thereof. The adhesive includes PEEK, SPEEK, PPV, PEKK, PEO, Nafion, PVA, PTFE, PPy, pMeT, PVDF, PEDOT, PANI, or the combination thereof. The solid polymer electrolyte 40 of the super capacitor 10 includes an ion-conducting polymer or a combination of an ion-conductive polymer and an ionic compound. The thickness of the solid polymer electrolyte 40 is between 0.5 and 50 µm. The ion-conducting polymer includes PEEK, SPEEK, PPV, PEKK, PEO, Nafion, PVA, PTFE, PPy, pMeT, PVDF, PEDOT, PANI, or the combination thereof. The ionic compound includes lithium hydroxide, lithium nitrate, lithium trifluoromethyl sulfur trioxide, or the combination thereof.

A second embodiment of the present invention is described as follow:

Manufacturing Sample A of the Present Invention.

Sample A is manufactured according to the first manufacturing procedure. A modified carbonaceous electrode 30 is obtained via the first manufacturing procedure. Two of the modified carbonaceous electrodes 30 are then combined with a solid polymer electrolyte 40. The solid polymer electrolyte 40 is placed between the two modified carbonaceous electrodes 30. Wherein the solid polymer electrolyte 40 and the two modified carbonaceous electrodes 30 are pressed together to form a super capacitor 10.

The solid polymer electrolyte 40 of the present invention belongs to the Sulfonated polyether ether ketone (SPEEK) family. The SPEEK is dissolved in Dimethyl sulfoxide (DMSO) to form a SPEEK solution. The SPEEK solution is first spread onto a flat glass and then baked to form a membrane of the solid polymer electrolyte. The membrane of the solid polymer electrolyte can be torn off from the flat glass and serve as the solid polymer electrolyte 40 of the super capacitor 10. Wherein the thickness of the solid polymer electrolyte 40 is 30 µm.

The SPEEK solution may also be used to prepare the active material 32. For example, the SPEEK solution can serve as an adhesive to evenly combine 85 wt % of a main component (activated carbon) and 5 wt % of conductivity additive (carbon black, brand name XC-72R) to form a slurry of the active material 32. The solid part of the slurry includes 85 wt % of activated carbon, 5 wt % carbon black, and 10 wt % SPEEK. The slurry can be spread onto the conductive carbonaceous material 31 to obtain the modified carbonaceous electrode 30.

Figure 5:
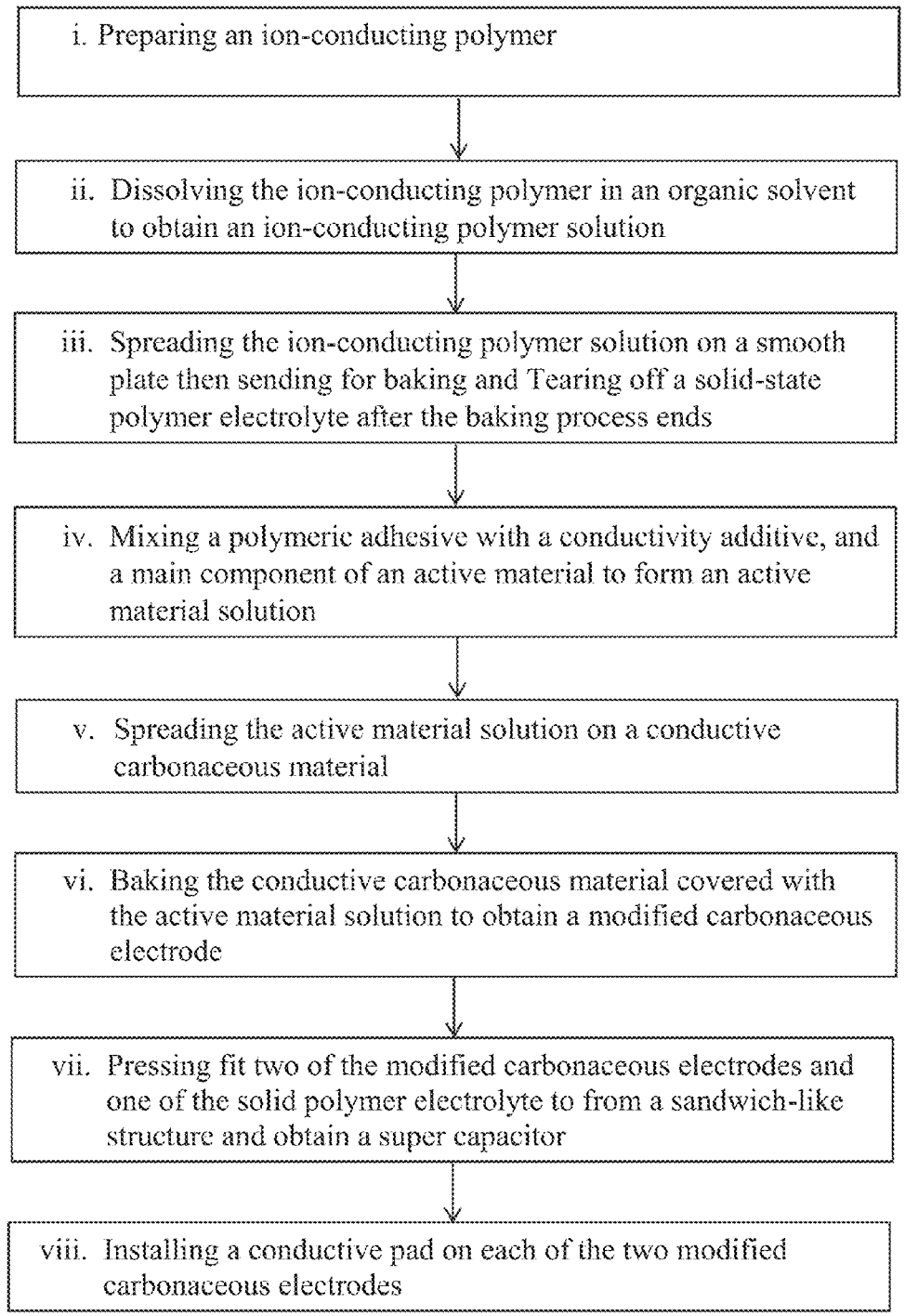
FIG. 5 is a flow chart of the manufacturing procedure of the present invention.

Referring to FIG. 5, the manufacture of the conductive carbonaceous material 31 is based on the U.S. Pat. No. 7,670,970 B2 and U.S. Pat. No. 7,927,575 B2. The slurry is distributed onto the conductive carbonaceous material 31. Wherein part of the slurry will cover the surface of the conductive carbonaceous material 31 and the rest of the slurry will permeate into the conductive carbonaceous material 31 to cover the entire surface of every carbon fiber of the conductive carbonaceous material 31. The conductive carbonaceous material 31 covered with the slurry is then baked at 120° C. and forms the modified carbonaceous electrode 30. The dimension of the modified carbonaceous electrode 30 is 2 cm×2 cm, and contains 5 mg of activated carbon. Finally, spray DMSO solution onto the two surfaces of the SPEEK solid polymer electrolyte 40 and place the SPEEK solid polymer electrolyte 40 between two of the modified carbonaceous electrode 30. After that, perform a press-fit procedure to combine the modified carbonaceous electrode 30 and the SPEEK solid polymer electrolyte 40 in order to obtain the super capacitor 10.

Manufacturing Sample B Using Traditional Electrodes.

Sample B is the control group in reference to Sample A. Referring to FIG. 2, the manufacturing of Sample B is the same as that of Sample A except that Sample B employs traditional electrodes instead of the modified carbonaceous electrode 30. The purpose of Sample B is to compare the effect traditional electrode and the modified carbonaceous electrode 30. The traditional electrode uses the same active material 32 as Sample A (85 wt % of activated carbon, 5 wt % of carbon black, 10 wt % SPEEK) and the active material 32 is spread onto the surface of a copper-foil current collector. The area covered with the active material 32 is 2 cm×2 cm. The active material 32 is solidified after baking and the traditional electrode is ready. Each of the traditional electrodes contains 5 mg of activated carbon. The manufacture of the SPEEK solid polymer electrolyte membrane is the same as described in Sample A. The SPEEK solid polymer electrolyte membrane is placed between two of the traditional electrodes, wherein the traditional electrodes and the SPEEK solid polymer electrolyte membrane are combined via press-fit process to obtain Sample B.

Figure 8:
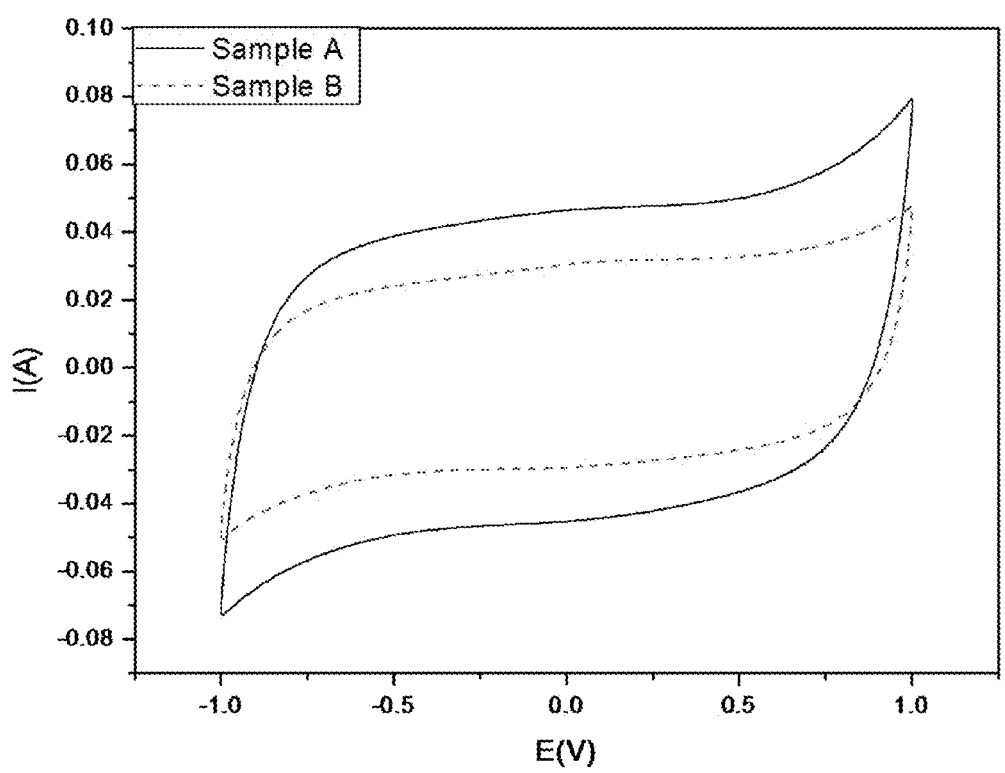
FIG. 8 is the current-voltage diagram (CV diagram) of the super capacitor comprising Sample A and the super capacitor comprising Sample B.

FIG. 8 is the current-voltage diagram (CV diagram) of the super capacitor 10 comprising Sample A and the super capacitor 10 comprising Sample B. The super capacitor 10 of this present invention shows to be better than super capacitors using traditional electrodes under a 50 mV/s scanning frequency. Wherein the capacitance density of Sample A and Sample B is 1.5 F/cm$^2$ and 0.89 F/cm$^2$ respectively. Furthermore, Sample A has a high electrical power ratio density of 4.0 kW/kg, and a high energy density of 20 Wh/kg. This result clearly shows that the super capacitor 10 comprising the modified carbonaceous electrode 30 performs better than the super capacitor 10 comprising traditional electrode.

Figure 9:
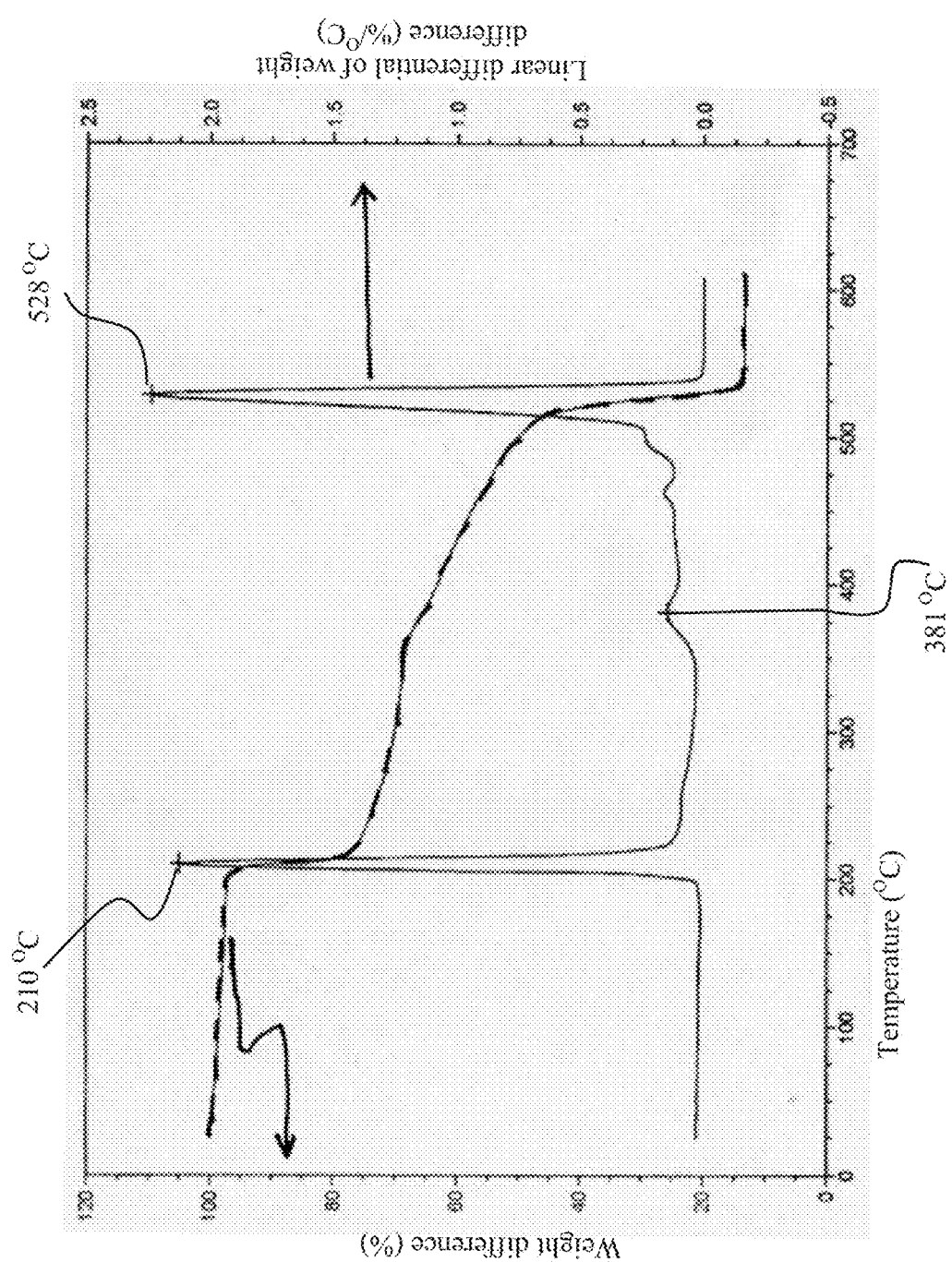
FIG. 9 shows the thermo gravimetric analysis (TGA) of Sample A.

FIG. 9 shows the thermo gravimetric analysis (TGA) of Sample A. 500 mg of the modified carbonaceous electrode 30 was taken out for the thermo gravimetric analysis. The TGA result was further calculated under first degree differential analysis. The result shows that thermal degradation peak occurs at high temperatures includes 210° C., 381° C., and 528° C. There is no thermal degradation peak lower that 200° C., which indicates that the modified carbonaceous electrode 30 and the solid polymer electrolyte are stable at high temperature. Therefore, the super capacitor 10 is a safe energy storage device that can be used under critical temperature. The thermal stability of the super capacitor 10 is much better than traditional super capacitors using water-based electrolytes (working temperature<100° C.), liquid-state organic and gel-like electrolytes (working temperature<150° C.).

Manufacturing of Sample C.

Sample C is an asymmetric super capacitor, wherein the cathode is a non-Faradaic electrode and the anode is a Faradaic electrode. The SPEEK solid polymer electrolyte 40 is manufactured according to the same procedure as mentioned in the making of Sample A. The thickness of the SPEEK solid polymer electrolyte 40 used in Sample C is 60 μm. The SPEEK solution may also be used as adhesives as described in the preparation of Sample A, wherein the slurry prepared serves as the active material 32 for the cathode. The cathode slurry is distributed on the surface of the conductive carbonaceous material 31 as illustrated in the preparation of Sample A. The size of the modified carbonaceous electrode 30 is also 2 cm×2 cm, and the main component of the active material 32 is 5 mg activated carbon.

Furthermore, the SPEEK is used as adhesive to prepare an anode slurry as the active material 32 comprising 10 wt % SPEEK, 80 wt % of the main component (which is Polymethylthiophene in this embodiment), and 5 wt % of conductivity additive (which is carbon black in this embodiment). The anode slurry is distributed on another conductive carbonaceous material 31, wherein the conductive carbonaceous material 31 is produced according to the first manufacturing procedure. The other modified carbonaceous electrode 30 serves as the anode is obtained after baking. The main component of the active material 32 here contains 5 mg of Polymethylthiophene. Finally, place the SPEEK solid polymer electrolyte 40 between the cathode and the anode, then combine the electrodes and the electrolyte together by press-fit process and obtain the asymmetric super capacitor 10.

Figure 10:
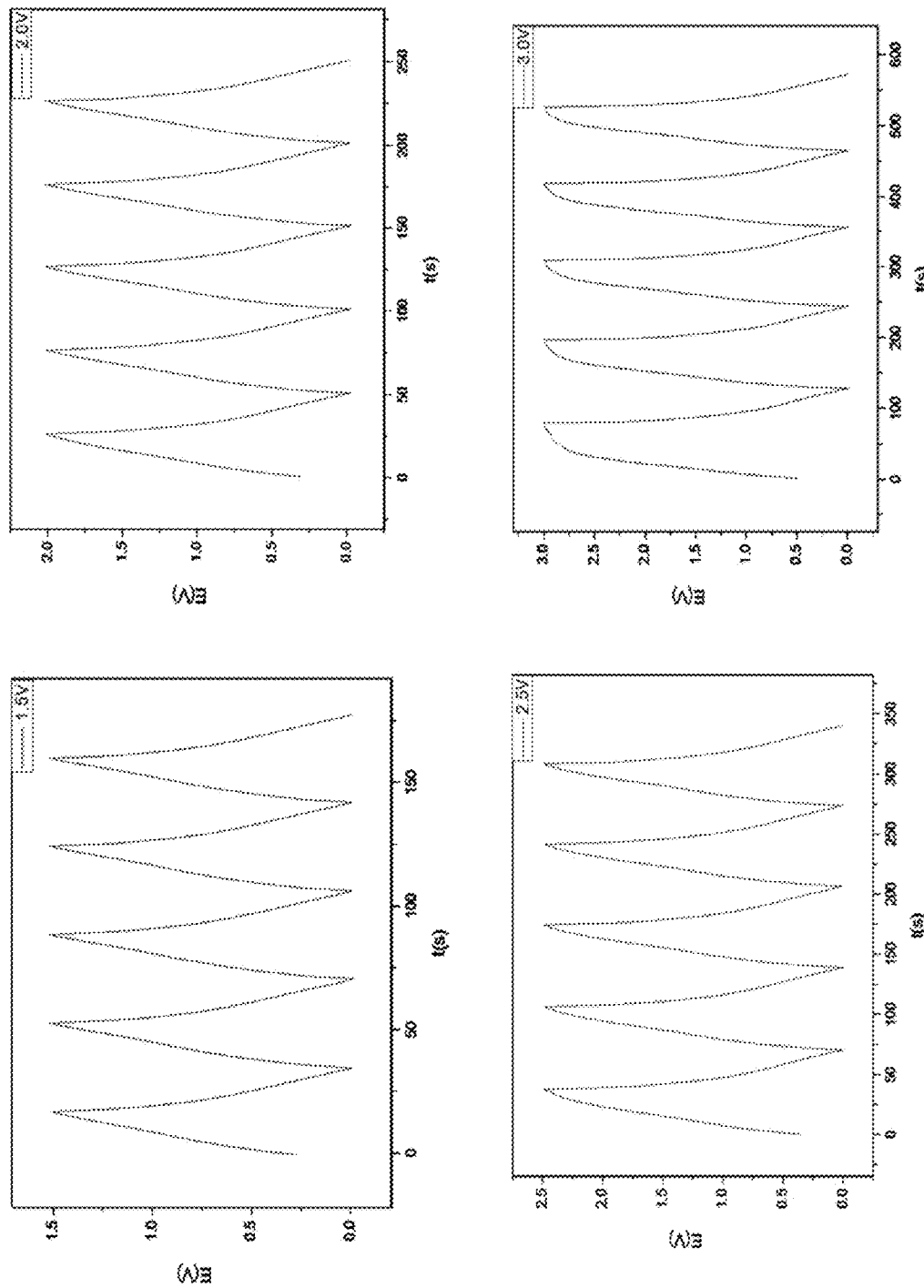
FIG. 10 shows the result of the Constant Current Charge Discharge test (CCCD test) of Sample C.

Sample C has passed the Constant Current Charge Discharge test (CCCD test) for the charge and discharge of currents between 0-3V. The result is shown in FIG. 10. The test is conducted with a single unit not in series. The charge and discharge current density is 10 mA/cm$^2$. The study shows that the super capacitor of this invention can still charge and discharge normally even at high voltage such as 3.0V. This result is much higher than that the rated voltage ($V_R$) of currently known commercial water-based electrolytes (which normally has a $V_R$ of 1.0-1.7V) and currently known commercial organic electrolytes (which has a $V_R$ of 2.5-2.7V).

Manufacturing of Sample D.

Sample D uses copolymer to produce solid polymer electrolyte 40. First, dissolve 5 wt % of Polyvinyl (PVA) and 95 wt % of SPEEK into DMSO to prepare a PVA-SPEEK solution. Spread the PVA-SPEEK solution onto a flat glass and then send for baking to solidify PVA-SPEEK. A PVA-SPEEK solid copolymer electrolyte membrane can be torn off the flat glass after baking and serves as the solid polymer electrolyte 40 as shown in FIG. 2. The thickness of the solid polymer electrolyte 40 is 50 μm in Sample D. PVA-SPEEK solution is also used to produce the active material 32. Wherein PVA-SPEEK solution is used as adhesive (10 wt % of the active material 32 is PVA-SPEEK) to combine 85 wt % of activated carbon and 5 wt % of carbon black in order to obtain a slurry of the active material 32. The slurry is then distributed onto the conductive carbon fiber produced according to the second manufacturing procedure. The conductive carbon fiber covered with the slurry is baked at 140° C. and weaved in a two-dimensional manner to form the modified carbonaceous electrode 30. The size of the electrode is 2 cm×2 cm and the amount of the activated carbon is 5 mg. Finally, place the PVA-SPEEK copolymer electrolyte 40 membrane between two of the modified carbonaceous electrode 30 and undergo a press-fit procedure to combine the electrodes and the electrolyte in order to obtain the super capacitor 10.

Figure 11:
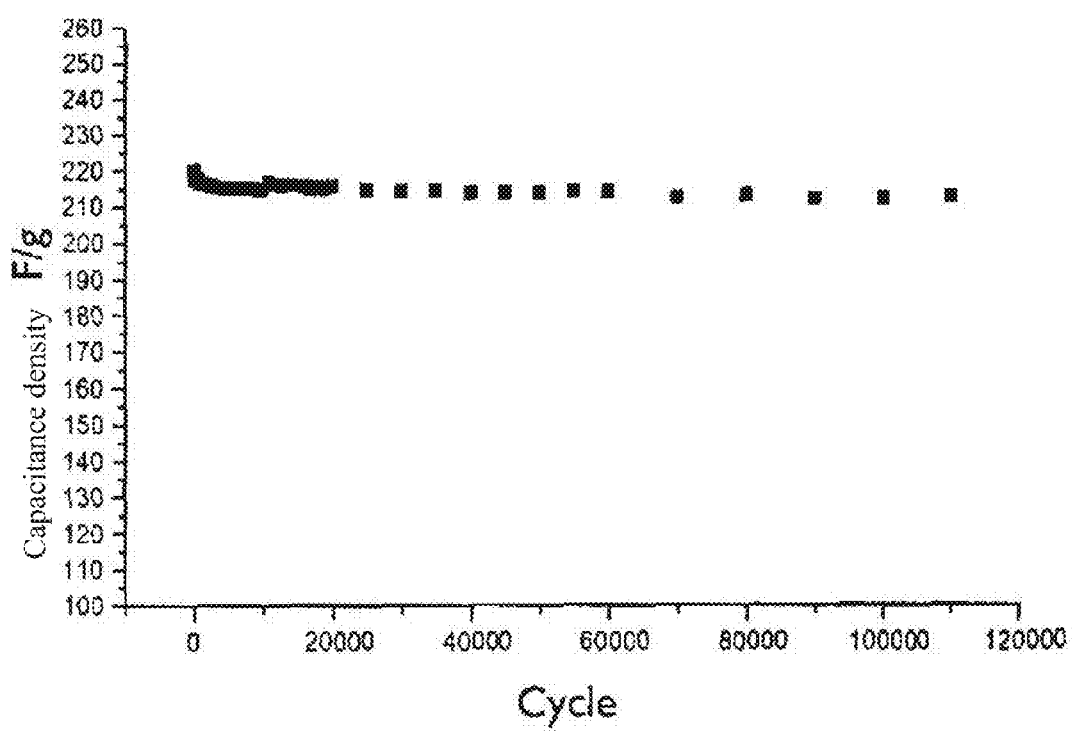
FIG. 11 shows the result of the Cyclic life test of Sample D.

The result of the Cyclic life test of Sample D is shown in FIG. 11. The test is conducted under a constant current density of 10 mA/cm$^2$. The study shows that the before the test is 220 F/g, and it slightly decreased to 214 F/g after 120000 times of test cycles. The decline rate is less than 3% and there is no obvious decrease in the performance of functions.

What is claimed is:

1. A method of manufacturing a super capacitor, comprising:

preparing an ion-conducting polymer;

dissolving the ion-conducting polymer in an organic solvent to obtain an ion-conducting polymer solution;

spreading the ion-conducting polymer solution on a smooth plate then sending for baking and tearing off a solid-state polymer electrolyte after the baking process ends;

mixing an adhesive, a conductivity additive, and a main component to form an active material;

spreading the active material on a first conductive carbonaceous material and a second conductive carbonaceous material, wherein the first conductive carbonaceous material and the second conductive carbonaceous material each comprises a carbon fiber having a resistivity lower than $5 \times 10^{-2}$ Ω/cm, a density greater than 1.6 g/cm$^3$, and a carbon content greater than 65 wt %;

baking the first conductive carbonaceous material and the second conductive carbonaceous material, both are covered with the active material, to obtain a first modified carbonaceous electrode and a second modified carbonaceous electrode respectively;

pressing the first modified carbonaceous electrode, the solid-state polymer electrolyte, and the second modified carbonaceous electrode in a sandwich-like structure to obtain a super capacitor; and installing a first conductive pad and a second conductive pad on the first modified carbonaceous electrode and the second modified carbonaceous electrode respectively.

2. The method of claim 1, wherein the first conductive carbonaceous material and the second conductive carbonaceous material each further comprises a carbon cloth, a carbon felt, a carbon paper, a carbon pellet, or a carbon powder.

3. The method of claim 1, wherein the ion-conducting polymer is made of one selected from the group consisting of polyether ether ketone, sulfonated polyether ether ketone, polyphenylene vinylene, poly(ether ketone ketone), polyethylene oxide, polyvinyl alcohol, polytetrafluoroethylene, polyethylenedioxythiophene, polyaniline, polypyrrole, and the combination thereof.

4. The method of claim 1, wherein the step of spreading the active material solution is performed in a process selecting from the group consisting of painting, tape casting, pressing, spraying, immersing, and the combination thereof.

5. The method of claim 1, the modified carbonaceous electrode is made by weaving the carbon fiber in a process selecting from the group consisting of needle punching, papermaking process, and the combination thereof.

6. A method of manufacturing a super capacitor, comprising:
- mixing an adhesive, a conductivity additive, and a main component to form an active material;
- immersing a first conductive carbonaceous material and a second conductive carbonaceous material into the active material, wherein the first conductive carbonaceous material and the second conductive carbonaceous material each contains a carbon fiber having a resistivity lower than $5 \times 10^{-2}$ $\Omega$/cm, a density greater than 1.6 g/cm$^3$, and a carbon content greater than 65 wt %;
- drying the active material in the first conductive carbonaceous material and the second conductive carbonaceous material to obtain a first modified carbonaceous electrode and a second modified carbonaceous electrode;
- providing a solid-state polymer electrolyte;
- combining the first modified carbonaceous electrode, the solid-state polymer electrolyte, and the second carbonaceous electrode sequentially in a sandwich-like structure; and
- configuring a first conductive pad and a second conductive pad to the first modified carbonaceous electrode and the second modified carbonaceous electrode respectively.

7. The method of claim 6, wherein the adhesive is one selected from the group consisting of polyether ether ketone, sulfonated polyether ether ketone, polyphenylene vinylene, poly(ether ketone ketone), polyethylene oxide, polyvinyl alcohol, polytetrafluoroethylene, polyethylenedioxythiophene, polyaniline, polypyrrole, and the combination thereof.

8. The method of claim 6, wherein the conductivity additive is a carbon black, a graphene, or a carbon nanotube.

9. The method of claim 6, wherein the main component is an activated carbon powder with a specific surface area between 20 and 2000 m$^2$/g.

10. The method of claim 6, wherein the main component is one selected from the group consisting of polyether ether ketone, sulfonated polyether ether ketone, polyphenylene vinylene, poly(ether ketone ketone), polyethylene oxide, polyvinyl alcohol, polytetrafluoroethylene, polyethylenedioxythiophene, polyaniline, polypyrrole, and the combination thereof.

11. The method of claim 6, wherein the main component is a metal oxide powder selected from the group consisting of ruthenium dioxide, titanium dioxide, magnesium dioxide, zinc oxide, nickel oxide, iridium dioxide, and the combination thereof.

12. The method of claim 6, wherein the first conductive carbonaceous material and the second conductive carbonaceous material each has a sheet resistance of less than 200 $\Omega$/sq, a density greater than 1.6 g/cm$^3$, and a carbon content of greater than 65 wt %.

13. The method of claim 6, wherein the first conductive carbonaceous material and the second conductive carbonaceous material each has a specific surface area ranging from 20 m$^2$/g to 2000 m$^2$/g.

14. The method of claim 6, wherein the active material is distributed within the vacant spaces and on the surfaces of the first conductive carbonaceous material and the second conductive carbonaceous material.

15. The method of claim 6, wherein the first conductive carbonaceous material and the second conductive carbonaceous material each further contains a carbon cloth, a carbon felt, a carbon paper, a carbon pellet, or a carbon powder.

16. The method of claim 6, wherein the step of providing the solid-state polymer electrolyte comprises the sub-steps of:
- dissolving an ion-conducting polymer in an organic solvent to obtain an ion-conducting polymer solution;
- applying the ion-conducting polymer solution onto a plate; and
- drying the ion-conducting polymer solution on the plate to obtain the solid-state polymer electrolyte.

17. The method of claim 16, wherein the thickness of the solid-state polymer electrolyte is ranging from 0.5 μm to 50 μm.

18. The method of claim 6, wherein the step of drying is performed under a temperature between 60° C. and 400° C.

* * * * *